United States Patent
Ding et al.

(10) Patent No.: US 12,175,048 B2
(45) Date of Patent: Dec. 24, 2024

(54) SELF-CAPACITANCE TOUCH PANEL AND TOUCH DISPLAY PANEL

(71) Applicant: WUHAN CHINA STAR OPTOELECTRONICS SEMICONDUCTOR DISPLAY TECHNOLOGY CO., LTD., Wuhan (CN)

(72) Inventors: Ding Ding, Wuhan (CN); Liang Fang, Wuhan (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 267 days.

(21) Appl. No.: 17/289,216

(22) PCT Filed: Mar. 12, 2021

(86) PCT No.: PCT/CN2021/080369
§ 371 (c)(1),
(2) Date: Sep. 27, 2023

(87) PCT Pub. No.: WO2022/160419
PCT Pub. Date: Aug. 4, 2022

(65) Prior Publication Data
US 2024/0012523 A1  Jan. 11, 2024

(30) Foreign Application Priority Data

Jan. 26, 2021  (CN) ............ 202110114661.7

(51) Int. Cl.
*G06F 3/041* (2006.01)
*G06F 3/044* (2006.01)

(52) U.S. Cl.
CPC .......... *G06F 3/0446* (2019.05); *G06F 3/0445* (2019.05)

(58) Field of Classification Search
CPC ..... G06F 3/0446; G06F 3/0445; G06F 3/0418
(Continued)

(56) References Cited

U.S. PATENT DOCUMENTS

2014/0125883 A1  5/2014  Chang et al.
2017/0090636 A1*  3/2017  Ding .................. G06F 3/0445
(Continued)

FOREIGN PATENT DOCUMENTS

CN  205899516 U  1/2017
CN  107229373 A  10/2017
(Continued)

OTHER PUBLICATIONS

Chinese Office Action issued in corresponding Chinese Patent Application No. 202110114661.7 dated Mar. 2, 2022, pp. 1-9.
(Continued)

*Primary Examiner* — Thuy N Pardo
(74) *Attorney, Agent, or Firm* — PV IP PC; Wei Te Chung

(57) ABSTRACT

The present application discloses a self-capacitance touch panel and a touch display panel. One or more of redundant electrodes are connected in parallel with each of signal transmission lines of the self-capacitance touch panel to reduce trace impedance of the signal transmission lines (especially for the signal transmission lines connected to self-capacitance touch electrodes at a far end). Problems of inability to drive touches, large touch power consumption, and marked incongruities in touch performance of different regions caused by excessive trace impedance are relieved.

19 Claims, 7 Drawing Sheets

(58) Field of Classification Search
USPC .......................................... 345/173, 156, 174
See application file for complete search history.

(56) References Cited

U.S. PATENT DOCUMENTS

| | | | |
|---|---|---|---|
| 2018/0157354 A1 | 6/2018 | Blondin et al. | |
| 2018/0314371 A1* | 11/2018 | Jin | ................. G06F 3/0412 |
| 2019/0155436 A1* | 5/2019 | Jin | ................. G06F 3/0416 |
| 2019/0179445 A1* | 6/2019 | Moon | ................. G09G 3/2003 |
| 2020/0167027 A1 | 5/2020 | Tsao et al. | |
| 2023/0120673 A1* | 4/2023 | Bok | ................. H01L 27/1214 |
| | | | 345/174 |
| 2023/0409156 A1* | 12/2023 | Kim | ................. G06F 3/0446 |

FOREIGN PATENT DOCUMENTS

| | | |
|---|---|---|
| CN | 108089748 A | 5/2018 |
| CN | 109976582 A | 7/2019 |
| CN | 110034168 A | 7/2019 |
| CN | 111665987 A | 9/2020 |
| CN | 111665998 A | 9/2020 |
| CN | 112394826 A | 2/2021 |
| WO | 2015180345 A1 | 12/2015 |

OTHER PUBLICATIONS

International Search Report in International application No. PCT/CN2021/080369, mailed on Oct. 26, 2021.
Written Opinion of the International Searching Authority in International application No. PCT/CN2021/080369, mailed on Oct. 26, 2021.

* cited by examiner

L1-a   L1-b   L1-c   L1-d

SELF-CAPACITANCE TOUCH PANEL AND TOUCH DISPLAY PANEL

RELATED APPLICATIONS

This application is a Notional Phase of PCT Patent Application No. PCT/CN2021/080369 having international filing date of Mar. 12, 2021, which claims the benefit of priority of Chinese Patent Application Nos. 202110114661.7 filed on Jan. 26, 2021. The contents of the above applications are all incorporated by reference as if fully set forth herein in their entirety.

FIELD OF INVENTION

The present invention is related to the field of display technology and specifically, to a self-capacitance touch panel and a touch display panel.

BACKGROUND OF INVENTION

With rapid development of display technology, touch display panels are increasingly widely used in electronic products. The touch display panels include touch panels, and capacitive touch panels are one of current mainstream products. According to a touch principle, the capacitive touch panels can be divided into self-capacitance touch panels and mutual-capacitance touch panels. The self-capacitance touch panels have an advantage of fast scanning speed and are suitable for single-point touch and gesture touch.

A touch principle of the self-capacitance touch panels is as follows. A self-capacitance touch panel includes an electrode array composed of a plurality of self-capacitance touch electrodes, wherein each of the self-capacitance touch electrode forms a capacitor with ground. When a finger touches the self-capacitance touch panel, a capacitance of the finger is superimposed on a capacitance of the panel, which increases the capacitance of the self-capacitance touch panel. During touch detection, the self-capacitance touch panel sequentially detects horizontal self-capacitance touch electrodes and vertical self-capacitance touch electrodes. According to a change of the capacitance before and after a touch of the finger, horizontal and vertical coordinates of a touch point are respectively determined to constitute a touch coordinate plane, thereby obtaining positional information on the touch point.

Technical Problem

As shown in FIG. 1, a current self-capacitance touch panel includes a plurality of touch electrodes 10 disposed in a same layer and insulated from each other. The plurality of touch electrodes 10 are arranged in a matrix. Each of the touch electrodes 10 is connected to a touch integrated circuit 30 through a signal transmission line 20. However, the self-capacitance touch panel shown in FIG. 1 has disadvantages. As a size of the self-capacitance touch panel increases, lengths of touch signal lines increase (especially for the signal transmission lines connected to the self-capacitance touch electrodes at a far end), and corresponding trace impedance also increases. Excessive trace impedance increases resistance and capacitance load, which causes incongruities in touch performance of different regions. In addition, the excessive trace impedance also causes a problem of inability to drive touches or an increase in touch power consumption, which has a severe negative effect on touch performance.

SUMMARY OF INVENTION

Technical Solution

The present application provides a self-capacitance touch panel and a touch display panel in view of deficiencies of prior art, so as to relieve a problem of negative effects on touch performance due to large trace impedance.

In a first aspect, the present application provides a self-capacitance touch panel, including:
- a touch integrated circuit;
- a signal transmission wiring layer including a plurality of signal transmission lines extending in a row direction or a column direction, wherein each of the signal transmission lines is electrically connected to the touch integrated circuit;
- a first insulating layer disposed on a surface of the signal transmission wiring layer and defined with a plurality of signal through-holes;
- a touch electrode array layer disposed on a surface of the first insulating layer away from the signal transmission wiring layer and including a plurality of touch electrodes insulated from each other, wherein each of the touch electrodes is individually connected to one of the signal transmission lines through one of the signal through-holes; and
- a plurality of redundant electrodes, wherein at least one of the signal transmission lines is connected to one or more of the redundant electrodes, and the redundant electrodes are not connected to the touch electrodes.

In an embodiment of the present application, each of the signal transmission lines is connected in parallel with at least one of the redundant electrodes, so as to reduce impedance of all of the signal transmission lines.

In an embodiment of the present application, the redundant electrodes are disposed on the surface of the first insulating layer away from the signal transmission wiring layer and positioned in a same layer as the touch electrode array layer, which is beneficial to simplify manufacturing processes of the self-capacitance touch panel.

In an embodiment of the present application, the redundant electrodes are disposed at positions corresponding to the signal transmission lines, which is beneficial to connect the redundant electrodes in parallel with the signal transmission lines.

In an embodiment of the present application, the first insulating layer is further defined with a plurality of redundant through-holes, and the redundant electrodes are connected to the signal transmission lines through the redundant through-holes. This not only simplifies the manufacturing processes of the self-capacitance touch panel, but also increases a transmission cross-sectional area of the signal transmission line, thereby reducing corresponding trace impedance.

In an embodiment of the present application, the redundant electrodes are disposed around the touch electrodes; and/or each of the touch electrodes is defined with at least one opening at a position corresponding to one of the signal transmission lines, each of the redundant electrodes is disposed in the opening, and edges of each of the redundant electrodes are not in contact with edges of the opening.

In an embodiment of the present application, the redundant electrodes are disposed in an extending direction of the signal transmission lines, and the redundant electrodes are disposed at one side or two opposite sides of a node between one of the touch electrodes and one of the signal transmission lines.

In an embodiment of the present application, one of the redundant electrodes is disposed at a side of the node between one of the touch electrodes and one of the signal transmission lines away from the touch integrated circuit.

In a second aspect, the present application provides a touch display panel, including:
an array substrate;
a display element layer disposed on a surface of the array substrate; and
a self-capacitance touch panel disposed on a side of the display element layer away from the array substrate, wherein the self-capacitance touch panel includes:
a touch integrated circuit;
a signal transmission wiring layer including a plurality of signal transmission lines extending in a row direction or a column direction, wherein each of the signal transmission lines is electrically connected to the touch integrated circuit;
a first insulating layer disposed on a surface of the signal transmission wiring layer and defined with a plurality of signal through-holes;
a touch electrode array layer disposed on a surface of the first insulating layer away from the signal transmission wiring layer and including a plurality of touch electrodes insulated from each other, wherein each of the touch electrodes is individually connected to one of the signal transmission lines through one of the signal through-holes; and
a plurality of redundant electrodes, wherein at least one of the signal transmission lines is connected to one or more of the redundant electrodes, and the redundant electrodes are not connected to the touch electrodes.

In an embodiment of the present application, each of the signal transmission lines is connected in parallel with at least one of the redundant electrodes, so as to reduce impedance of all of the signal transmission lines.

In an embodiment of the present application, the redundant electrodes are disposed on the surface of the first insulating layer away from the signal transmission wiring layer and positioned in a same layer as the touch electrode array layer, which is beneficial to simplify manufacturing processes of the self-capacitance touch panel.

In an embodiment of the present application, the redundant electrodes are disposed at positions corresponding to the signal transmission lines, which is beneficial to connect the redundant electrodes in parallel with the signal transmission lines.

In an embodiment of the present application, the first insulating layer is further defined with a plurality of redundant through-holes, and the redundant electrodes are connected to the signal transmission lines through the redundant through-holes. This not only simplifies the manufacturing processes of the self-capacitance touch panel, but also increases a transmission cross-sectional area of the signal transmission line, thereby reducing corresponding trace impedance.

In an embodiment of the present application, the redundant electrodes are disposed around the touch electrodes; and/or each of the touch electrodes is defined with at least one opening at a position corresponding to one of the signal transmission lines, each of the redundant electrodes is disposed in the opening, and edges of each of the redundant electrodes are not in contact with edges of the opening.

In an embodiment of the present application, the redundant electrodes are disposed in an extending direction of the signal transmission lines, and the redundant electrodes are disposed at one side or two opposite sides of a node between one of the touch electrodes and one of the signal transmission lines.

In an embodiment of the present application, one of the redundant electrodes is disposed at a side of the node between one of the touch electrodes and one of the signal transmission lines away from the touch integrated circuit.

In an embodiment of the present application, the display element layer is an organic light-emitting diode layer.

In an embodiment of the present application, the touch display panel further includes an encapsulating layer disposed on a surface of the display element layer away from the array substrate. The self-capacitance touch panel is disposed on a surface of the encapsulating layer away from the display element layer.

In an embodiment of the present application, the touch display panel further includes a second insulating layer disposed on a surface of the encapsulating layer away from the display element layer. The self-capacitance touch panel is disposed on a surface of the second insulating layer away from the encapsulating layer.

Advantageous Effect

The present application provides the self-capacitance touch panel and the touch display panel. One or more of the redundant electrodes are connected in parallel with each of the signal transmission lines of the self-capacitance touch panel to reduce the trace impedance of the signal transmission lines (especially for the signal transmission lines connected to the self-capacitance touch electrodes at a far end). Problems of inability to drive touches, large touch power consumption, and marked incongruities in touch performance of different regions caused by excessive trace impedance are relieved. Preferably, the redundant electrodes and the self-capacitance touch electrodes are disposed in a same layer, and the redundant electrodes are disposed at positions corresponding to the signal transmission lines, so as to achieve a purpose of simplifying manufacturing processes and reducing production costs. The touch display panel including the self-capacitance touch panel can be applied to various types of electronic products, and has advantages of fast touch response times and ideal touch performance.

DETAILED DESCRIPTION OF EMBODIMENTS

In order to make above purposes, features, and advantages of the present application more obvious and understandable, the following is a detailed description of preferred embodiments of the present application in junction with accompanying drawings. Furthermore, directional terms mentioned in the present application such as "upper", "lower", "front", "rear", "left", "right", "in", "out", "side", etc., only refer to directions in the accompanying drawings. Thus, the adoption of directional terms is used to describe and understand the present application, but not to limit the present application.

In this application, terms "first" and "second" are used for descriptive purposes only, and cannot be understood as indicating or implying relative importance or implicitly indicating the number of technical features indicated. Therefore, the features defined as "first" and "second" may explicitly or implicitly include one or more of the features. In the description of the present application, the meaning of "multiple" is two or more, unless specifically defined otherwise.

In this application, a term "an extending direction of signal transmission lines" refers to a direction that the signal transmission lines extend toward touch electrodes, taking a node between one of the signal transmission lines and one of the touch integrated circuit as a starting point.

Figure 1:
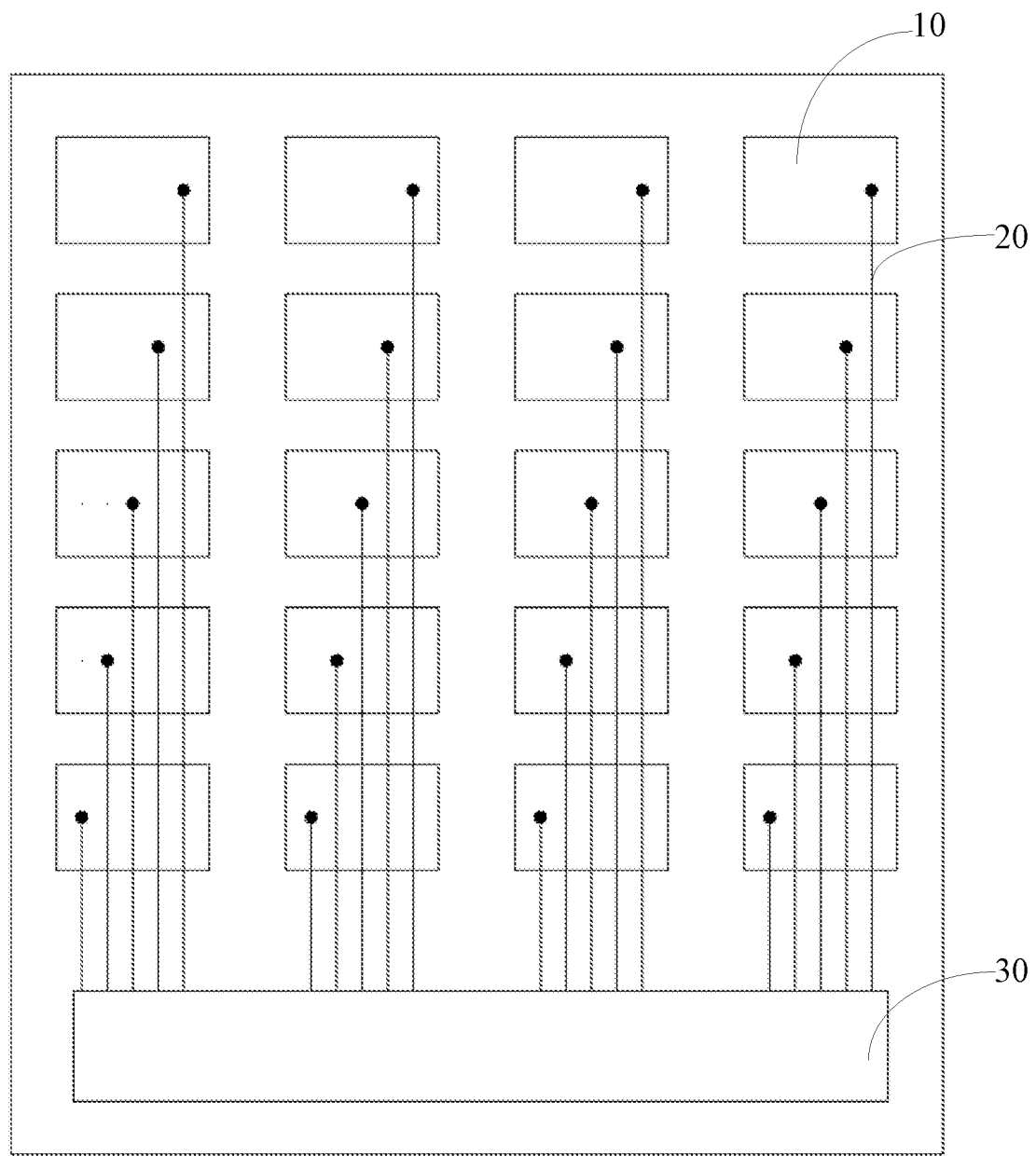
FIG. 1 is a structural schematic diagram of a self-capacitance touch panel in prior art.
Figure 2:
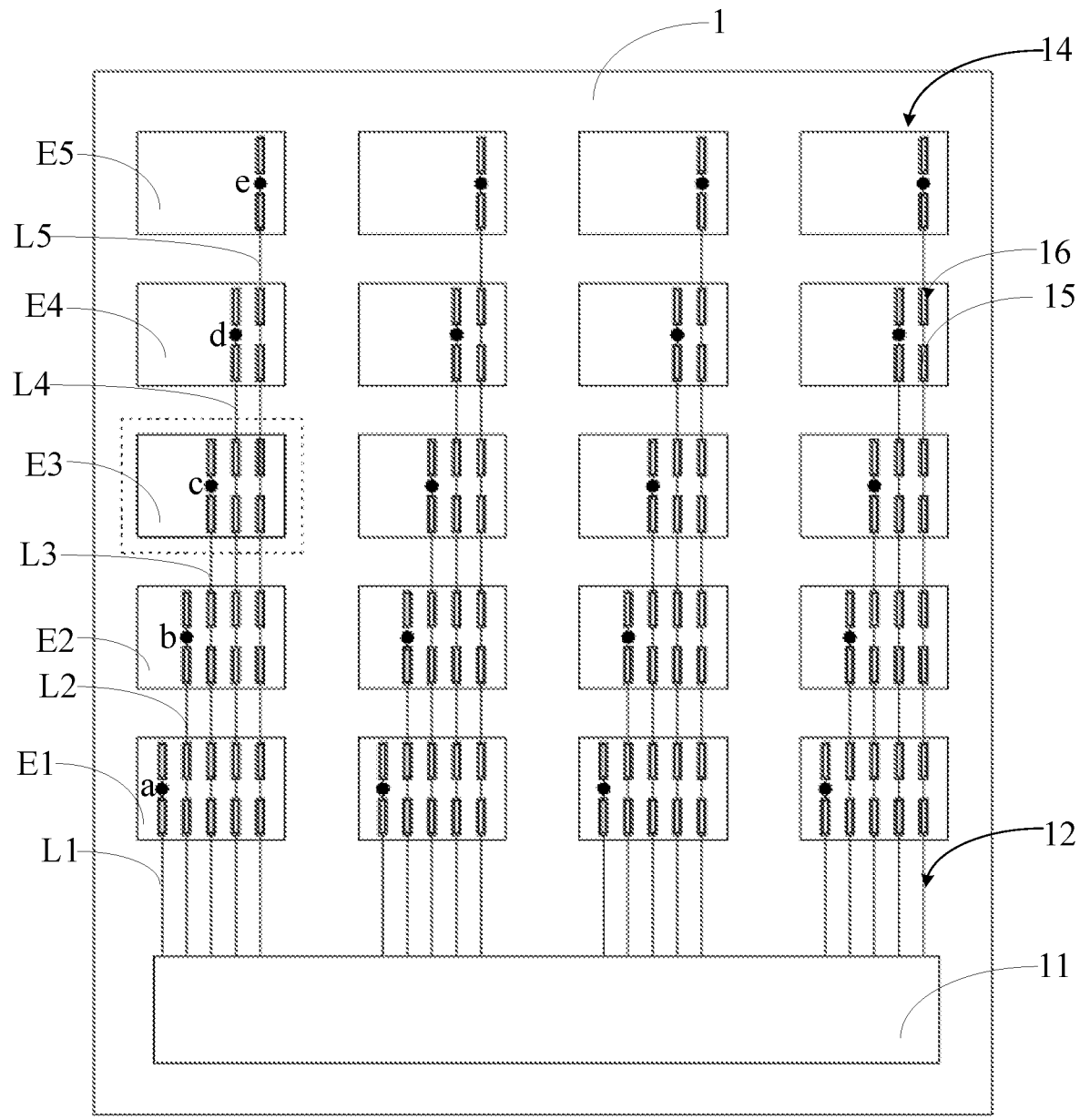
FIG. 2 is a structural schematic diagram of a self-capacitance touch panel provided by an embodiment of the present application.
Figure 3:
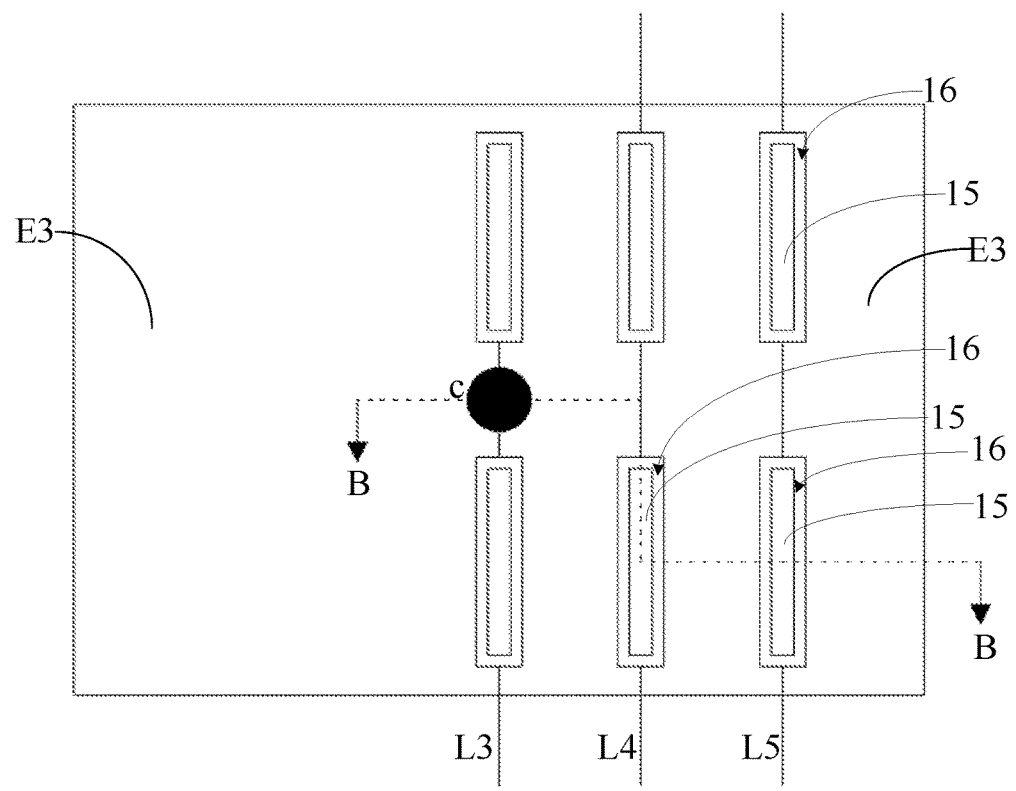
FIG. 3 is a partial enlarged view of a dotted box in FIG. 2.
Figure 4:
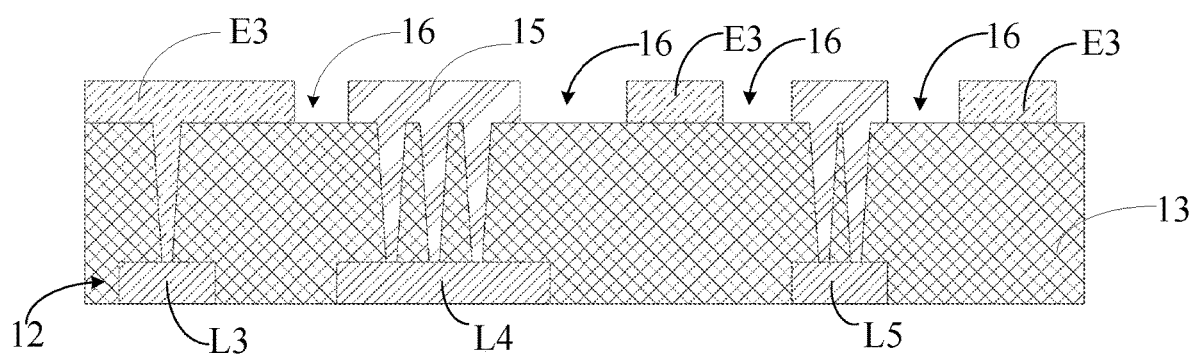
FIG. 4 is a schematic diagram of a cross-sectional view along line B-B in FIG. 3.

In a first aspect, the present application provides a self-capacitance touch panel as shown in FIGS. 2-4. The self-capacitance touch panel 1 mainly includes a touch integrated circuit 11, a signal transmission wiring layer 12, a first insulating layer 13, a touch electrode array layer 14, and a plurality of redundant electrodes 15. The touch integrated circuit 11 is disposed at one end of the self-capacitance touch panel 1. The touch electrode array layer 14 is electrically connected to the touch integrated circuit 11 through the signal transmission wiring layer 12. The signal transmission wiring layer 12, the first insulating layer 13, and the touch electrode array layer 14 are disposed in sequence. The plurality of redundant electrodes 15 and the touch electrode array layer 14 are disposed in a same layer.

The signal transmission wiring layer 12 includes a plurality of signal transmission lines extending in a column direction. Each of the signal transmission lines is electrically connected to the touch integrated circuit 11. The plurality of signal transmission lines are parallel to each other and insulated from each other. It should be explained that the plurality of signal transmission lines can also extend in a row direction.

The touch electrode array layer 14 includes a plurality of touch electrodes insulated from each other. Each of the touch electrodes is individually connected to one of the signal transmission lines. In other words, a number of the touch electrodes is same as a number of the signal transmission lines, and in an extending direction of the signal transmission lines, each of the signal transmission lines is connected to one of the touch electrodes and is electrically insulated from other touch electrodes. Each of the touch electrodes forms a capacitor with ground to constitute a capacitor matrix. The plurality of touch electrodes are arranged in a matrix on a surface of the first insulating layer 13 away from the signal transmission wiring layer 12. A material of the touch electrodes can be transparent metal oxides such as indium tin oxide (In2O3:Sn, ITO), indium zinc oxide (ZnO:In, IZO), gallium zinc oxide (ZnO:Ga, GZO), aluminum oxide zinc (ZnO:Al, AZO), and can be copper (Cu), molybdenum (Mo), aluminum (Al), chromium (Cr), titanium (Ti), or other low-impedance conductive materials.

A function of the touch integrated circuit 11 is to detect a change of a capacitance formed between each of the touch electrodes and the ground according to a touch sensing signal output by each of the touch electrodes. In this way, a touch position is determined by obtaining a capacitance change of the capacitor matrix. The touch integrated circuit 11 can be, for example, a flexible printed circuit (FPC).

The first insulating layer 13 is a transparent organic layer or a transparent inorganic layer, and its material can be, for example, silicon oxide (SiOx), silicon nitride (SiNx), high-transmittance organic photoresist, etc. The first insulating layer 13 is defined with a plurality of signal through-holes. Each of the touch electrodes is individually connected to one of the signal transmission lines through one of the signal through-holes.

The redundant electrodes 15 are connected in parallel with the signal transmission lines to reduce trace impedance of the signal transmission lines, and there is no signal transmission between the redundant electrodes 15 and the touch electrodes. The redundant electrodes 15 can be made of a same material as the material of the touch electrodes or can be made of a material different from the material of the touch electrodes. Preferably, a material of the redundant electrodes 15 is same as the material of the touch electrodes to simplify manufacturing processes.

The redundant electrodes 15 and the touch electrodes can be disposed in a same layer or can be disposed in different layers. Preferably, the redundant electrodes 15 and the touch electrodes are disposed in the same layer to simplify manufacturing processes. In other words, the redundant electrodes 15 are disposed on the surface of the first insulating layer 13 away from the signal transmission wiring layer 12 and positioned in a same layer as the touch electrode array layer.

As a preferred embodiment, each of the signal transmission lines is connected in parallel with at least one of the redundant electrodes 15 to reduce the trace impedance of the signal transmission lines. The redundant electrodes 15 are disposed at positions corresponding to the signal transmission lines. The first insulating layer 13 is further defined with a plurality of redundant through-holes. The redundant electrodes 15 are connected to the signal transmission lines through the redundant through-holes. Each of the touch electrodes is defined with at least one opening 16 at a position corresponding to one of the signal transmission lines. Each of the redundant electrodes 15 is disposed in the opening 16, and edges of each of the redundant electrodes 15 are not in contact with edges of the opening 16. Horizontal cross-sections of each of the redundant electrodes 15 and the opening 16 are rectangular, and an area of the horizontal cross-section of the opening 16 is larger than an area of the horizontal cross-section of each of the redundant electrodes 15.

In an embodiment of the present application, the redundant electrodes 15 are disposed in the extending direction of the signal transmission lines. The redundant electrodes 15 are disposed at one side or two opposite sides of a node between one of the touch electrodes and one of the signal transmission lines.

In an embodiment of the present application, one of the redundant electrodes 15 is disposed at a side of the node between one of the touch electrodes and one of the signal transmission lines away from the touch integrated circuit 11.

As shown in FIGS. 2-4, the touch electrode array layer 14 of the self-capacitance touch panel 1 is a five rows by four columns matrix composed of twenty touch electrodes. In the matrix, there are sequentially a first row to a fifth row from bottom to top, and there are sequentially a first column to a fourth column from left to right. The touch integrated circuit 11 is disposed adjacent to an end of the first row of the touch electrodes. The touch electrode array layer 14 corresponds to twenty signal transmission lines extending in the column direction.

For the touch electrode array layer 14, a layout of each column is same. The following is an example for the first column, and the second to fourth columns are not repeatedly described. In a direction from bottom to top, five touch electrodes in the first column are marked as E1, E2, E3, E4, and E5 in sequence, and five signal transmission lines respectively connected to the touch electrodes E1, E2, E3, E4, and E5 are marked as L1, L2, L3, L4, and L5 in sequence.

Signal transmission lines L1 to L5 are under the touch electrode E1. Correspondingly, positions corresponding to the signal transmission lines L1 to L5 on the touch electrode E1 are respectively defined with two openings 16 arranged in the column direction. A total of ten openings 16 are arranged in a two rows by five columns matrix, and one of the redundant electrodes 15 is disposed in each of the openings 16. A node (reference sign a) between the touch electrode E1 and the signal transmission line L1 is positioned between the two openings 16 corresponding to the signal transmission line L1. In other words, the signal transmission line L1 continues to extend at point a to connect to the redundant electrodes 15 on a side of point a away from the touch integrated circuit 11. Signal transmission lines L2 to L5 are under the touch electrode E2. Correspondingly, positions corresponding to the signal transmission lines L2 to L5 on the touch electrode E2 are respectively defined with two openings 16 arranged in the column direction. A total of eight openings 16 are arranged in a two rows by four columns matrix, and one of the redundant electrodes 15 is disposed in each of the openings 16. A node (reference sign b) between the touch electrode E2 and the signal transmission line L2 is positioned between the two openings 16 corresponding to the signal transmission line L2. In other words, the signal transmission line L2 continues to extend at point b to connect to the redundant electrodes 15 on a side of point b away from the touch integrated circuit 11.

Similarly, there are signal transmission lines L3 to L5 under the touch electrode E3. Correspondingly, a total of six openings 16 are arranged in a two rows by three columns matrix, and one of the redundant electrodes 15 is disposed in each of the openings 16. A node (reference sign c) between the touch electrode E3 and the signal transmission line L3 is positioned between two openings 16 corresponding to the signal transmission line L3. The signal transmission line L3 continues to extend at point c to connect to the redundant electrodes 15 on a side of point c away from the touch integrated circuit 11. A total of four openings 16 are arranged in a two rows by two columns matrix, and one of the redundant electrodes 15 is disposed in each of the openings 16. A node (reference sign d) between the touch electrode E4 and the signal transmission line L4 is positioned between two openings 16 corresponding to the signal transmission line L4. The signal transmission line L4 continues to extend at point d to connect to the redundant electrodes 15 on a side of point d away from the touch integrated circuit 11. A total of two openings 16 are arranged in a two rows by one columns matrix, and one of the redundant electrodes 15 is disposed in each of the openings 16. A node (reference sign e) between the touch electrode E5 and the signal transmission line L5 is positioned between two openings 16 corresponding to the signal transmission line L5. The signal transmission line L5 continues to extend at point e to connect to the redundant electrodes 15 on a side of point e away from the touch integrated circuit 11.

It should be explained that only one of the redundant electrodes 15 can be disposed in one opening, or the plurality of redundant electrodes can also be disposed in one opening. It only needs to satisfy a condition that all the edges of the redundant electrodes in the opening are not in contact with the edges of the opening. Shapes and numbers of the openings 16 and the redundant electrodes 15 are not specifically limited and can be determined according to actual requirements.

Figure 5:
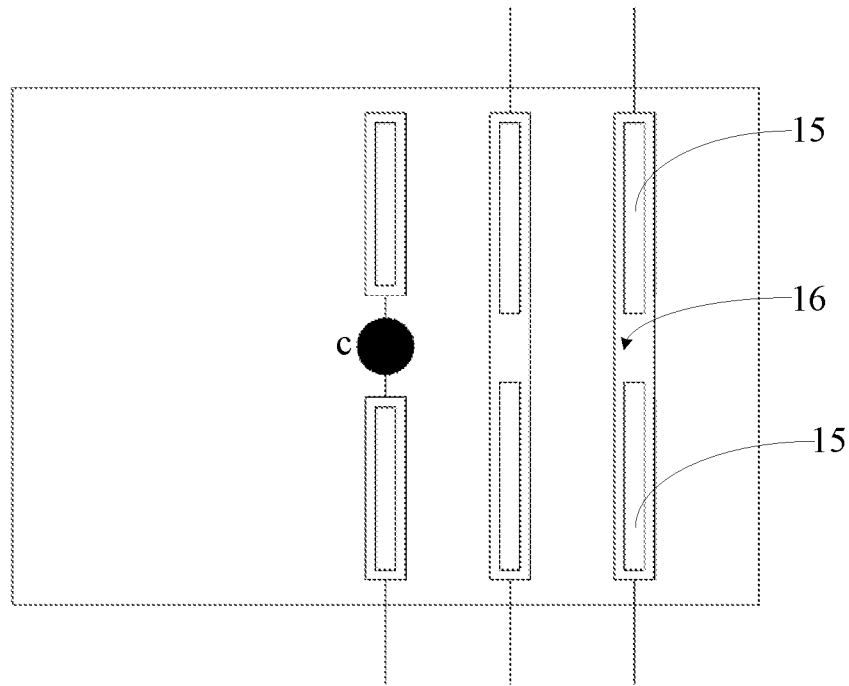
FIG. 5 is a schematic diagram of a layout of touch electrodes, redundant electrodes, and signal transmission lines provided by another embodiment of the present application.

In another embodiment of the present application, as shown in FIG. 5, the touch electrode E3 is taken as an example for description. A position corresponding to the signal transmission line L3 on the touch electrode E3 is defined with two openings 16. The two openings 16 are positioned at two opposite sides of a node (reference sign c) between the touch electrode E3 and the signal transmission lines L3. One of the redundant electrodes 15 is disposed in each of the two openings 16. Positions corresponding to the signal transmission lines L4 and L5 on the touch electrode E3 are respectively defined with one opening 16, and two redundant electrodes 15 spaced apart from each other are disposed in each of the openings 16.

In addition, each position corresponding to the signal transmission line on one of the touch electrodes can be defined with one or more openings, and one or more of the redundant electrodes can also be disposed in each opening. It only needs to satisfy a condition that each of the signal transmission lines is connected in parallel with at least one of the redundant electrodes.

Figure 6:
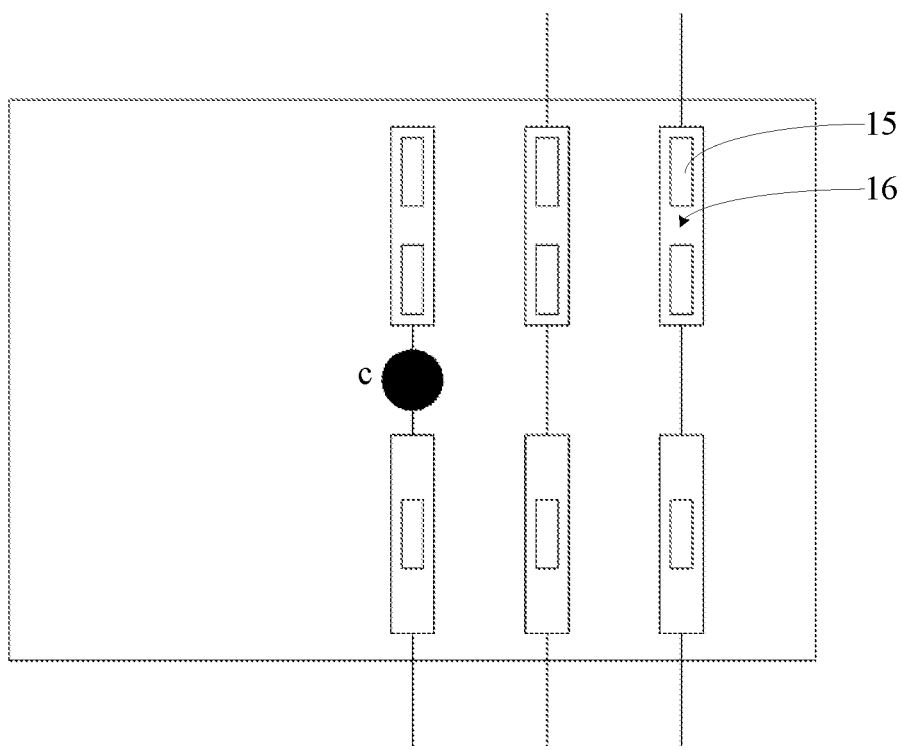
FIG. 6 is a schematic diagram of a layout of touch electrodes, redundant electrodes, and signal transmission lines provided by another embodiment of the present application.

In another embodiment, as shown in FIG. 6, the touch electrode E3 is taken as an example for description. Positions corresponding to the signal transmission lines L3 to L5 on the touch electrode E3 are respectively defined with two openings 16, so as to form a two rows by three columns matrix. Only one of the redundant electrodes 15 is disposed in each of the openings 16 in a first row. Two redundant electrodes 15 spaced apart from each other are disposed in each of the openings 16 in a second row. A node (reference sign c) between the touch electrode E3 and the signal transmission line L3 is positioned between the two openings 16 corresponding to the signal transmission line L3.

As a preferred embodiment, the signal transmission lines connected to a row of the touch electrodes adjacent to the touch integrated circuit have conventional structures, which means that they are not connected to the redundant electrodes. A rest of the signal transmission lines are connected in parallel with at least one of the redundant electrodes. The redundant electrodes are arranged at the positions corresponding to the signal transmission lines, and the redundant electrodes are connected to the signal transmission lines through the signal through-holes. A reason for this configuration is that the signal transmission lines are short, and the corresponding wiring impedance is small, so that there is no or less negative effects on touch performance. Therefore, the redundant electrodes are not connected in parallel with the signal transmission lines, thereby saving manufacturing costs.

Figure 7:
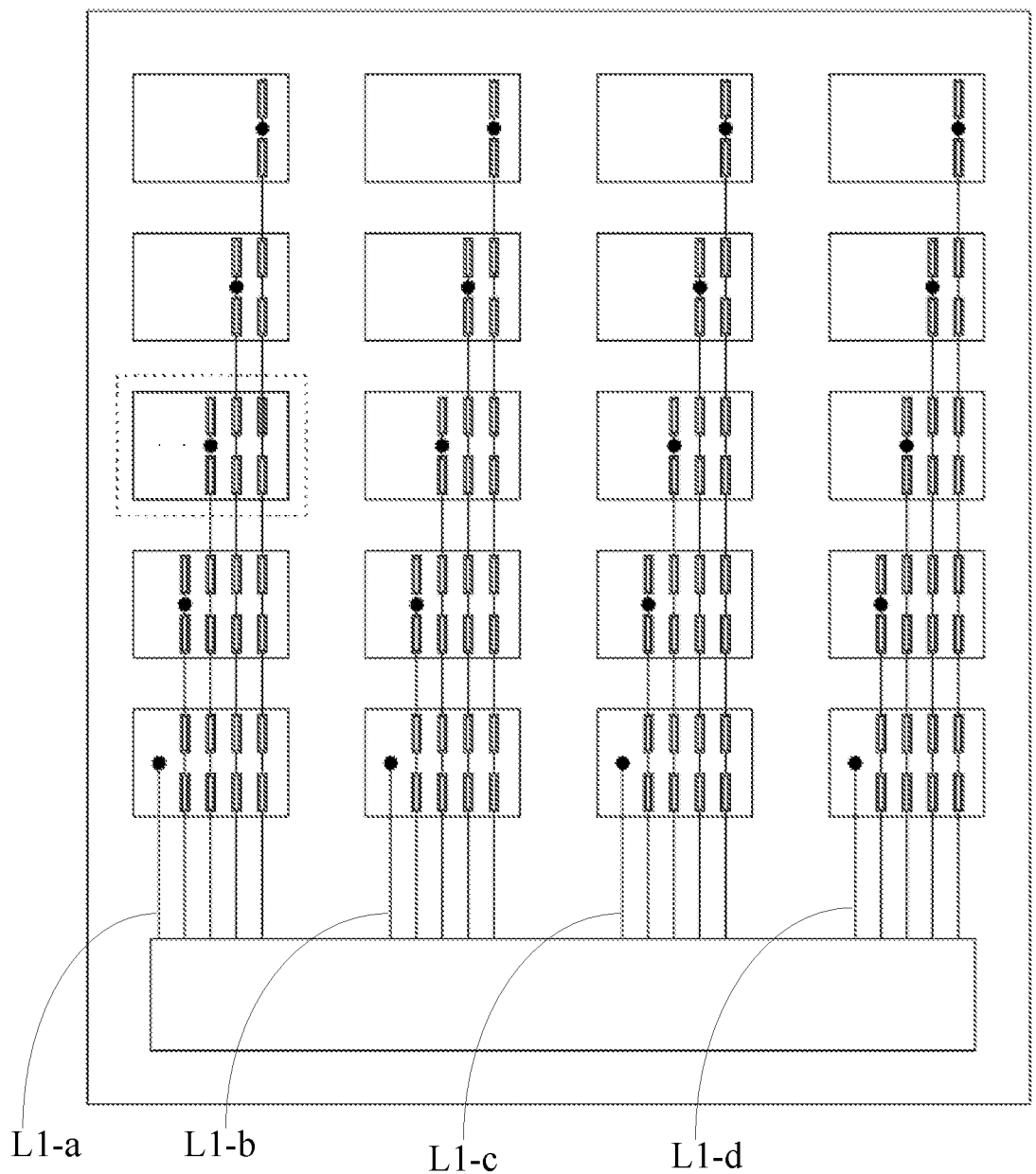
FIG. 7 is a structural schematic diagram of a self-capacitance touch panel provided by another embodiment of the present application.

In another embodiment, as shown in FIG. 7, a self-capacitance touch panel is different from the self-capacitance touch panel shown in FIG. 2 only in that four signal transmission lines (reference signs L1-a, L1-b, L1-c, and L1-d) respectively connected to the four touch electrodes are conventional structures. The four signal transmission lines are not connected in parallel with the redundant electrodes.

As an alternative embodiment, the redundant electrodes are disposed around the touch electrodes, and the redundant electrodes are disposed at positions corresponding to the signal transmission lines. The redundant electrodes are connected to the signal transmission lines through the signal through-holes.

Figure 8:
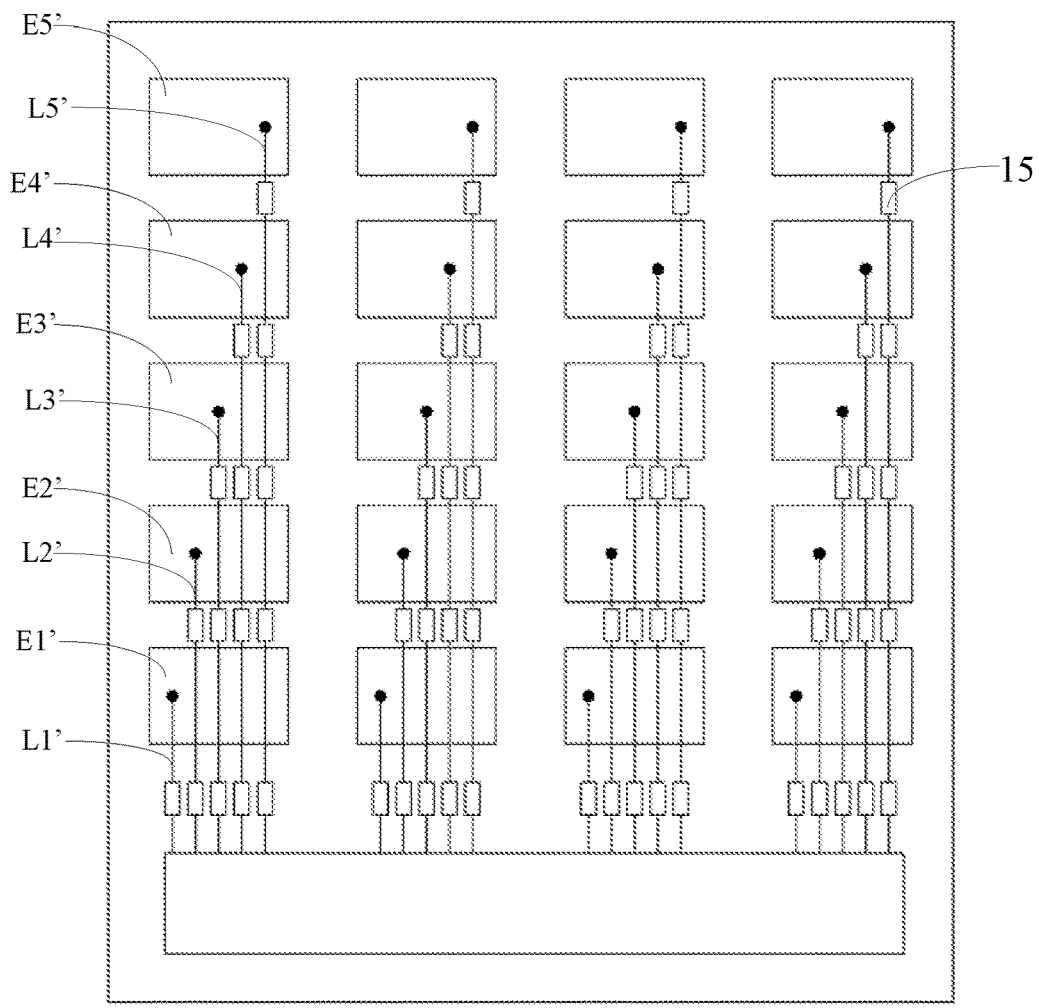
FIG. 8 is a structural schematic diagram of a self-capacitance touch panel provided by another embodiment of the present application.

In another embodiment, FIG. 8 shows a self-capacitance touch panel, which is different from the self-capacitance touch panel shown in FIG. 2 in that a layout of the redundant electrodes 15 is different.

Specifically, in the self-capacitive touch panel, a layout of the touch electrodes, the signal transmission lines, and the redundant electrodes of each column is same. The following is an example for the first column, and the second to fourth columns are not repeatedly described. In a direction from bottom to top, five touch electrodes in the first column are marked as E1', E2', E3', E4', and E5' in sequence, and five signal transmission lines respectively connected to the touch electrodes E1', E2', E3', E4', and E5' are marked as L1', L2', L3', L4', and L5' in sequence.

Five redundant electrodes 15 are disposed between the touch electrode E1' and the touch integrated circuit 11, and the five redundant electrodes 15 are respectively disposed at positions corresponding to the signal transmission lines L1' to L5'. Four redundant electrodes 15 are disposed between the touch electrode E1' and the touch electrode E2', and the four redundant electrodes 15 are respectively disposed at positions corresponding to the signal transmission lines L2' to L5'. Three redundant electrodes 15 are disposed between the touch electrode E2' and the touch electrode E3', and the three redundant electrodes 15 are respectively disposed at positions corresponding to the signal transmission lines L3' to L5'. Two redundant electrodes 15 are disposed between the touch electrode E3' and the touch electrode E4', and the two redundant electrodes 15 are respectively disposed at positions corresponding to the signal transmission lines L4' to L5'. One redundant electrode 15 is disposed between the touch electrode E4' and the touch electrode E5', and the one redundant electrode 15 is disposed at a position corresponding to the signal transmission line L5'.

It should be explained that for the plurality of the redundant electrodes, some of the redundant electrodes are disposed around the touch electrodes as the layout shown in FIG. 8, and a rest of the redundant electrodes are disposed in the openings of the touch electrodes as the layout shown in FIG. 2.

Figure 9:
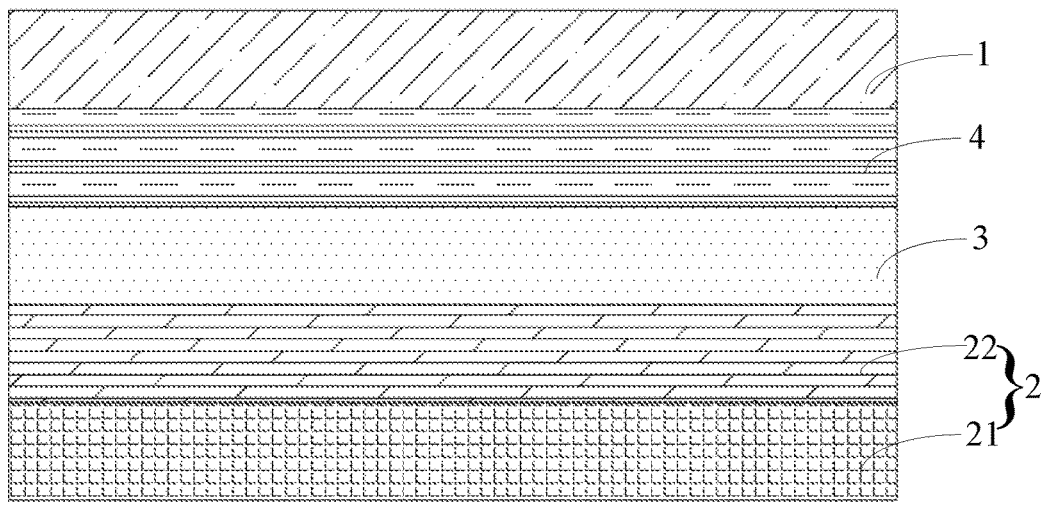
FIG. 9 is a structural schematic diagram of a touch display panel provided by an embodiment of the present application.

In a second aspect, the present application provides a touch display panel as shown in FIG. 9. The touch display panel includes an array substrate 2, a display element layer 3, an encapsulating layer 4, and a self-capacitance touch panel 1 disposed in sequence. The self-capacitance touch panel 1 is any one of the self-capacitance touch panel 1 in the first aspect.

The array substrate 2 includes a base substrate 21 and an array circuit layer 22. The array circuit layer 22 is disposed on the base substrate 21. The array circuit layer 22 includes a plurality of thin-film transistors (TFTs). The base substrate 21 can be a flexible substrate or a rigid substrate. The array circuit layer 22 can be formed on the base substrate 21 by an ink jet printing (IJP) process or a photolithography process.

The display element layer 3 is an organic light-emitting diode (OLED) layer, which means that the touch display panel is an OLED touch display panel. The OLED layer includes an anode layer, a hole injection layer, a hole transport layer, a light-emitting layer, an electron transport layer, an electron injection layer, and a cathode layer disposed in sequence. The OLED layer can be formed on a surface of the array substrate 2 by the IJP process or the photolithography process.

A material of the encapsulating layer 4 is an inert compound, which can be selected from one or more of silicon oxide (SiOx), silicon nitride (SiNx), and aluminum oxide ($Al_2O_3$). The encapsulating layer 4 can be a single-layer structure or a multi-layer structure. The encapsulating layer 4 can be formed on a surface of the display element layer 3 away from the array substrate 2 by the IJP process or a thin-film deposition process.

In an embodiment of the present application, the self-capacitance touch panel 1 can be directly formed on the encapsulating layer 4, which specifically includes steps of:

S1, using the IJP process or the photolithography process to form the signal transmission wiring layer and the touch integrated circuit on a surface of the encapsulating layer away from the display element layer, wherein the signal transmission wiring layer includes the plurality of signal transmission lines extending in the row direction or the column direction, and each of the signal transmission lines is electrically connected to the touch integrated circuit;

S2, using the IJP process or the thin-film deposition process to form the first insulating layer on a surface of the signal transmission wiring layer away from the encapsulating layer and using a laser drilling method or a mechanical drilling method to define the plurality of the signal through-holes on the first insulating layer; and S3, using the IJP process or the photolithography process to form the touch electrode array layer and the plurality of redundant electrodes on a surface of the first insulating layer away from the signal transmission wiring layer.

Figure 10:
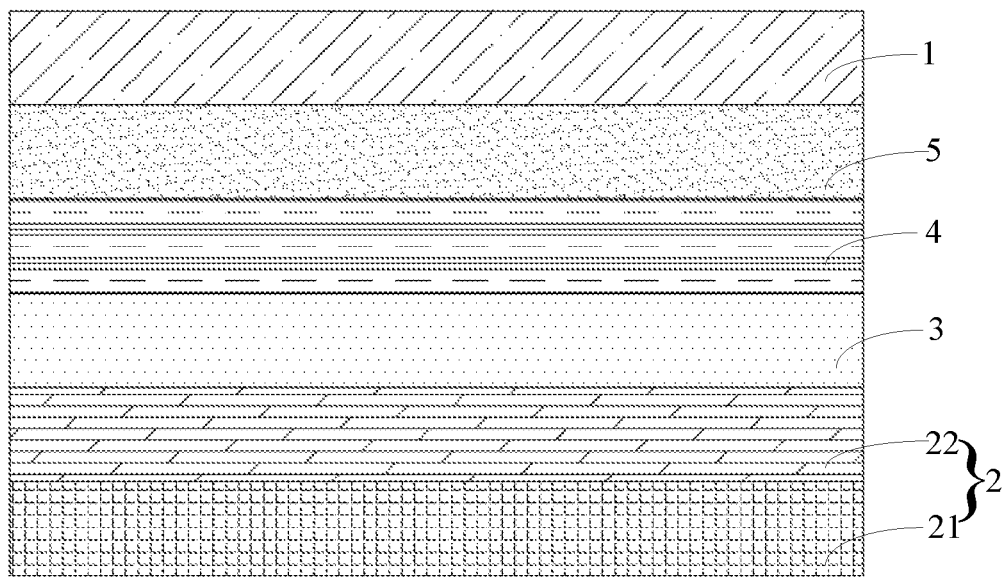
FIG. 10 is a structural schematic diagram of a touch display panel provided by another embodiment of the present application.

In another embodiment of the present application, as shown in FIG. 10, compared with the touch display panel shown in FIG. 9, the touch display panel of this embodiment further includes a second insulating layer 5 disposed on a surface of the encapsulating layer 4 away from the display element layer 3. The self-capacitance touch panel 1 is disposed on the surface of the second insulating layer 5 away from the encapsulating layer 4, which means that the self-capacitance touch panel 1 is not directly formed on the encapsulating layer 4.

A material of the second insulating layer 5 can be same as a material of the first insulating layer 13. Before forming the self-capacitance touch panel 1, the second insulating layer 13 can be formed on the surface of the encapsulating layer 4 away from the display element layer 3 by using the IJP process or the thin-film deposition process.

Figure 11:
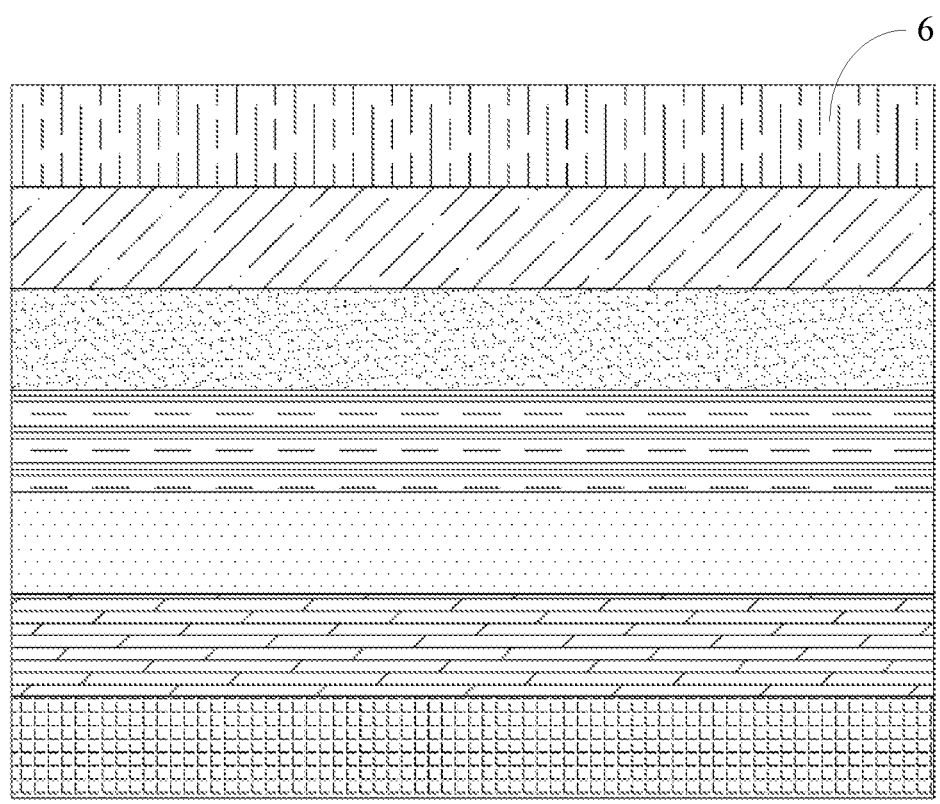
FIG. 11 is a structural schematic diagram of a touch display panel provided by another embodiment of the present application.

In another embodiment of the present application, as shown in FIG. 11, compared with the touch display panel shown in FIG. 10, the touch display panel of this embodiment further includes a polarizer layer 6 disposed on a surface of the self-capacitance touch panel 1 away from the encapsulating layer 4. The polarizer layer 6 has an anti-reflection function to increase display contrast of the touch display panel under strong light. The polarizer layer 6 can be adhered to a surface of the self-capacitance touch panel 1 away from the encapsulating layer 4 through optically clear adhesive (OCA).

It should be explained that a structure of the touch display panel is not limited to the above-mentioned structures. On a condition that requirements of self-capacitance touch are satisfied, the touch display panel can further adopt other layer structures. Those skilled in the art can understand that the touch display panel should further include other necessary components for realizing display functions. These necessary components are well known to those skilled in the art and are not repeatedly described herein.

The touch display panel described in the second aspect can be used as a display screen in various types of mobile terminals. The mobile terminals can be any product having a display screen such as mobile phones, tablet computers, digital cameras, digital video cameras, game consoles, audio reproduction devices, information terminals, smart wearable devices, smart electronic scales, car monitors, televisions. The smart wearable devices can be smart bracelets, smart watches, smart glasses, etc. The present application has been described by the above-mentioned related embodiments, but the above-mentioned embodiments are only examples for implementing the present application. It should be pointed out that disclosed embodiments do not limit the scope of the present application. On the contrary, modifications and equivalent arrangements included in the spirit and scope of claims are all included in the scope of the present invention.

What is claimed is:

1. A self-capacitance touch panel, comprising:
    a touch integrated circuit;
    a signal transmission wiring layer comprising a plurality of signal transmission lines extending in a row direction or a column direction, wherein each of the signal transmission lines is electrically connected to the touch integrated circuit;
    a first insulating layer disposed on a surface of the signal transmission wiring layer and defined with a plurality of signal through-holes;
    a touch electrode array layer disposed on a surface of the first insulating layer away from the signal transmission wiring layer and comprising a plurality of touch electrodes insulated from each other, wherein each of the touch electrodes is individually connected to one of the signal transmission lines through one of the signal through-holes; and
    a plurality of redundant electrodes, wherein at least one of the signal transmission lines is connected to one or more of the redundant electrodes, and the redundant electrodes are not connected to the touch electrodes.

2. The self-capacitance touch panel according to claim 1, wherein each of the signal transmission lines is connected in parallel with at least one of the redundant electrodes.

3. The self-capacitance touch panel according to claim 1, wherein the redundant electrodes are disposed on the surface of the first insulating layer away from the signal transmission wiring layer and positioned in a same layer as the touch electrode array layer.

4. The self-capacitance touch panel according to claim 3, wherein the redundant electrodes are disposed at positions corresponding to the signal transmission lines.

5. The self-capacitance touch panel according to claim 4, wherein the first insulating layer is further defined with a plurality of redundant through-holes, and the redundant electrodes are connected to the signal transmission lines through the redundant through-holes.

6. The self-capacitance touch panel according to claim 2, wherein the redundant electrodes are disposed around the touch electrodes; and/or
    each of the touch electrodes is defined with at least one opening at a position corresponding to one of the signal transmission lines, each of the redundant electrodes is disposed in the opening, and edges of each of the redundant electrodes are not in contact with edges of the opening.

7. The self-capacitance touch panel according to claim 6, wherein the redundant electrodes are disposed in an extending direction of the signal transmission lines, and the redundant electrodes are disposed at one side or two opposite sides of a node between one of the touch electrodes and one of the signal transmission lines.

8. The self-capacitance touch panel according to claim 7, wherein one of the redundant electrodes is disposed at a side of the node between one of the touch electrodes and one of the signal transmission lines away from the touch integrated circuit.

9. A touch display panel, comprising:
    an array substrate;
    a display element layer disposed on a surface of the array substrate; and
    a self-capacitance touch panel disposed on a side of the display element layer away from the array substrate;
    wherein the self-capacitance touch panel comprises:
    a touch integrated circuit;
    a signal transmission wiring layer comprising a plurality of signal transmission lines extending in a row direction or a column direction, wherein each of the signal transmission lines is electrically connected to the touch integrated circuit;
    a first insulating layer disposed on a surface of the signal transmission wiring layer and defined with a plurality of signal through-holes;
    a touch electrode array layer disposed on a surface of the first insulating layer away from the signal transmission wiring layer and comprising a plurality of touch electrodes insulated from each other, wherein each of the touch electrodes is individually connected to one of the signal transmission lines through one of the signal through-holes; and
    a plurality of redundant electrodes, wherein at least one of the signal transmission lines is connected to one or more of the redundant electrodes, and the redundant electrodes are not connected to the touch electrodes.

10. The touch display panel according to claim 9, wherein each of the signal transmission lines is connected in parallel with at least one of the redundant electrodes.

11. The touch display panel according to claim 9, wherein the redundant electrodes are disposed on the surface of the first insulating layer away from the signal transmission wiring layer and positioned in a same layer as the touch electrode array layer.

12. The touch display panel according to claim 11, wherein the redundant electrodes are disposed at positions corresponding to the signal transmission lines.

13. The touch display panel according to claim 12, wherein the first insulating layer is further defined with a plurality of redundant through-holes, and the redundant electrodes are connected to the signal transmission lines through the redundant through-holes.

14. The touch display panel according to claim 10, wherein the redundant electrodes are disposed around the touch electrodes; and/or
   each of the touch electrodes is defined with at least one opening at a position corresponding to one of the signal transmission lines, each of the redundant electrodes is disposed in the opening, and edges of each of the redundant electrodes are not in contact with edges of the opening.

15. The touch display panel according to claim 14, wherein the redundant electrodes are disposed in an extending direction of the signal transmission lines, and the redundant electrodes are disposed at one side or two opposite sides of a node between one of the touch electrodes and one of the signal transmission lines.

16. The touch display panel according to claim 15, wherein one of the redundant electrodes is disposed at a side of the node between one of the touch electrodes and one of the signal transmission lines away from the touch integrated circuit.

17. The touch display panel according to claim 9, wherein the display element layer is an organic light-emitting diode layer.

18. The touch display panel according to claim 17, further comprising an encapsulating layer disposed on a surface of the display element layer away from the array substrate, wherein the self-capacitance touch panel is disposed on a surface of the encapsulating layer away from the display element layer.

19. The touch display panel according to claim 17, further comprising a second insulating layer disposed on a surface of the encapsulating layer away from the display element layer, wherein the self- capacitance touch panel is disposed on a surface of the second insulating layer away from the encapsulating layer.

* * * * *